Figure 1:
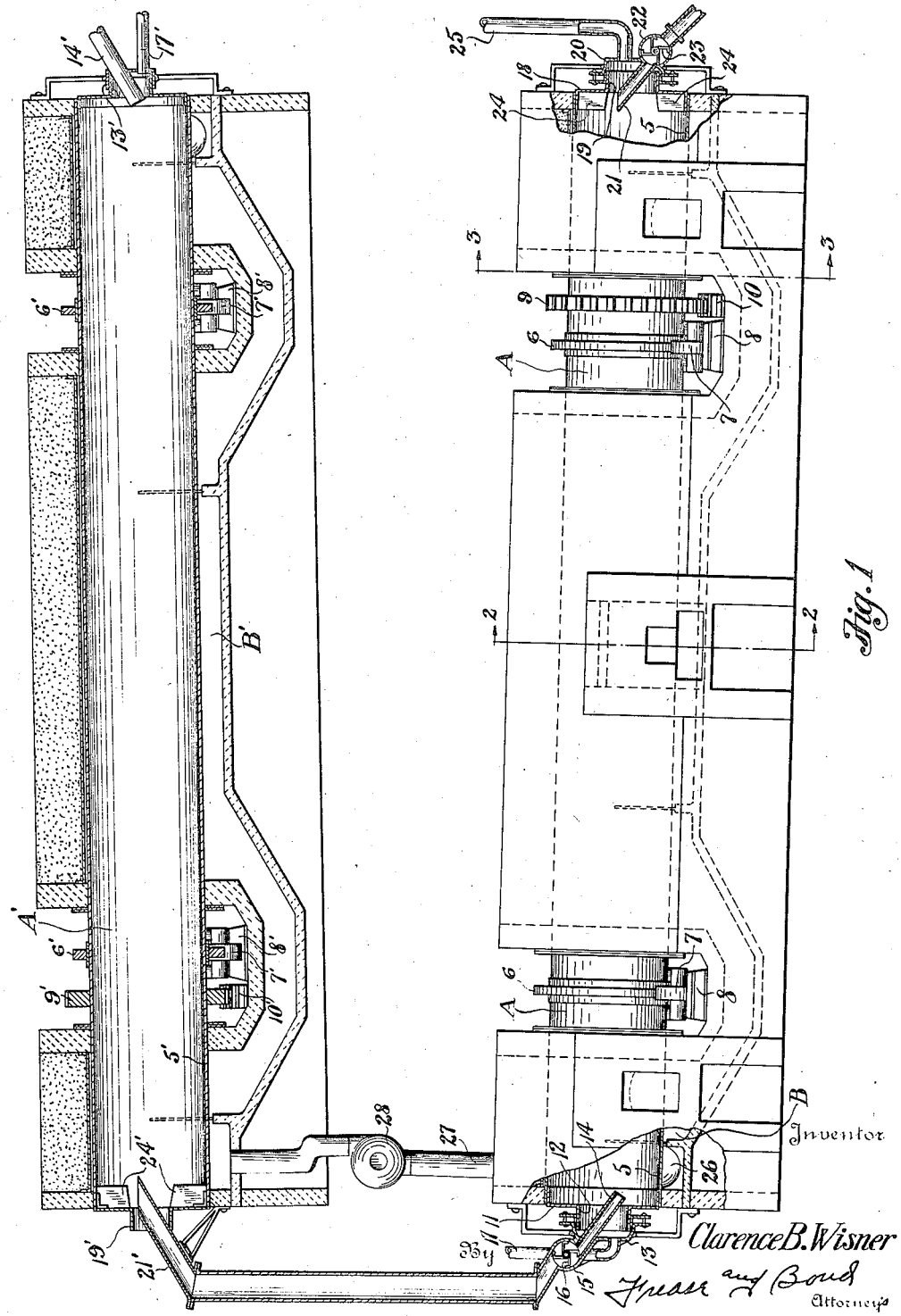

April 15, 1924.

C. B. WISNER 1,490,357

PROCESS OF EVOLVING HYDROCARBON FROM FUEL

Filed June 11, 1923    2 Sheets-Sheet 2

Inventor

Clarence B. Wisner

By Frease and Bond

Attorneys

Patented Apr. 15, 1924.

1,490,357

UNITED STATES PATENT OFFICE.

CLARENCE B. WISNER, OF CANTON, OHIO, ASSIGNOR TO THE CARBOCITE COMPANY, OF ALLIANCE, OHIO, A CORPORATION OF OHIO.

PROCESS OF EVOLVING HYDROCARBON FROM FUEL.

Application filed June 11, 1923. Serial No. 644,649.

*To all whom it may concern:*

Be it known that I, CLARENCE B. WISNER, a citizen of the United States, residing at Canton, in the county of Stark and State of Ohio, have invented new and useful Improvements in a Process of Evolving Hydrocarbon from Fuel, of which the following is a specification.

This invention relates to the heat treatment of solid substances yielding liquid hydrocarbons on destructive distillation; and also to a preliminary treatment of high volatile coals and the like, previous to a carbonization of the same.

When a substance containing volatile hydrocarbon constituents is heated with the total or partial exclusion of oxygen, chemical reactions occur that are highly complex and other substances appear in place of those treated. More particularly, vapors are educed, which condense into oil, liquor carrying chemicals, and non-condensable gas, from which light liquid hydrocarbons may be recovered by absorption. The yield and character of these substances will vary considerably with the method of applying heat and the conditions under which it is applied.

It has been found advantageous to heat fuel such as wood, peat, lignite, coal, and oil shale so as to educe liquid and gaseous hydrocarbons, which are separated from the solids remaining, hereafter called gangue. The liquid and gaseous hydrocarbons are then separated from each other. It has been the practice to treat fuel in retorts which are slowly heated to comparatively high temperatures, that is, more than 700° F. Packing the fuel in retorts having any substantial distance between the walls to which heat is applied, results in the heat slowly permeating the fuel due to the low heat conductivities and low specific heats of fuels of this character. The result is that the outside layer of fuel is raised to a very high temperature before the core is heated sufficiently to give off its volatile matter. This leads to an uneven treatment of the charge, and incomplete volatilization of the larger pieces, the critical heat not having reached the center of the larger pieces. A large proportion of the hydrocarbon vapors educed travel along the hot outer layer, and are cracked and produce a large percentage of fixed gases and unsaturated oils, which are lost in refining the product, a condition which is desirable in gas making but unprofitable when treating substances for their liquid hydrocarbons or residual fuels other than for their metallurgical coke. A large amount of heat and much time are required for the treatment of the fuel, thereby resulting in a comparatively low plant capacity, and rendering the industry non-commercial except in extraordinary cases.

This invention relates primarily to a process of heat treatment of fuels of the character described, which increases the capacity of the plant using the present processes and results in obtaining more liquid hydrocarbons. More specifically, the invention relates to a simpler process, whereby the fuel charged flows through a heated zone within a comparatively short time, heat being applied under precise conditions which make possible the production of volatile hydrocarbons within the predetermined time specified.

The factors distinguishing the present invention from the processes heretofore used are: those steps taking advantage of the heat of formation, and mass action. Heats of formation of various substances are positive and negative. Of the hydrocarbons, those in which the ratio of the number of hydrogen atoms to the number of carbon atoms is materially less than three to one, require the transfer of heat to the combining elements in order to complete the reaction. By the law of mass action, we know that the speed of any chemical reaction is proportional to the products of some powers of the weights of the reacting substances present in a unit of volume. It can be said that the speed of the chemical reaction increases when the weight (in gram-molecules) of the reacting substance in a unit of volume increases, although the relation may not be a simple proportion.

According to the present invention, the fuel is first flooded with heat, that is, extraneous heat is applied to fuel in a closed retort so as to rapidly bring the temperature of the fuel to that at which the hydrocarbons are educed, taking advantage of the heat of formation to rapidly permeate the pieces of fuel. Enough extraneous heat is supplied to make the thermic reaction of the hydrocarbons as rapid as possible and sufficient to educe the vapors causing the pieces to become porous. Heat is so applied that the temperature is brought up as rapidly as possible in distinction from the present practice, which compels the slow penetration of heat and a final high temperature.

Another important factor in my process is mass action. Hydrogen unites with carbon to form hydrocarbon vapors and gases. If hydrogen is present in a comparatively great quantity or volume at one time and in a nascent state or free to combine with carbon, the combination of these elements will be greater than if only the required number of molecules to create the reaction were present, thus producing more vapor and less gas. A quicker evolution and release of the hydrogens and a larger space in which to expand, produces mass action advantageous to the formation of a greater quantity of the lighter liquid hydrocarbons.

In the eduction of the volatile hydrocarbons from their gangues, the aim is to secure the largest possible amount of the lighter liquid hydrocarbons, that is, those ranging from $C_6H_6$ to $C_{16}H_{34}$. In applying heat slowly owing to difference in specific heats, it is evident that the carbon and oxygen will require less heat to raise them to the temperature at which they will combine and pass off as CO and $CO_2$ than to produce compounds containing hydrogen, in which case hydrogen is apt to pass off as unassociated hydrogen.

To obtain the largest quantity of liquid hydrocarbons, I find that the charge must be supplied with extraneous heat to raise it to a temperature at which the heat of formation will immediately act to carry the heat uniformly to and quickly through each individual piece of the charge without regard to size, causing the thermic reaction of the hydrocarbons in each piece to force open the pores in the piece and quickly and uniformly cause a complete evacuation of all the hydrocarbons of high heats of formation and combination, leaving the gangues practically free of liquid hydrocarbons in a porous condition.

To secure the conditions required to cause the reactions described, it is preferred that the charge shall be agitated in a cylindrical container filled with the hot vapors educed from the continuing charge, as it continuously passes in at one end and out at the other. This can best be done by rotating the container and regulating the time that the charge shall remain in the heated container by the speed of rotation.

I am aware that the use of the rotary furnaces has been attempted before for this purpose, but much higher heats have been used than those required in the present process, whose maximum may be from 700° to 900° F. An ordinary metal container will not stand a continuous heat of higher degree than that, and for this reason metal containers have never been successful for this purpose. Therefore, my use of a metal container is new, and is brought about by the discovered low heat necessary to complete the reaction.

A fuel in which the heat of formation produces a very noticeable effect is walnut shells. Experiment has shown that, in carbonizing walnut shells, if the fuel be brought to 400° F. by extraneous heat, gas and vapor are given off. If the extraneous heat is then shut off, the temperature may continue to increase as long as liquid vapors are given off, until a temperature approximately 550° F. is reached. At this temperature, vapors are no longer given off, and the application of further extraneous heat to produce higher temperatures fails to drive off more liquid vapors. The heat of formation generated in the shells may be sufficient to complete the chemical reactions, if sufficient extraneous heat is supplied to start the exothermic reactions.

But when dealing with hydrocarbon producing materials of a less oxygen content than nut shells or the like, the heat generated by the reacting chemicals grows gradually less as the contained oxygen is decreased, so that the amount of extraneous heat necessary to complete the eduction of liquid hydrocarbons depends upon the oxygen content of the individual material under treatment. That is to say, bituminous coals and other fossil fuels containing five to eight per cent of oxygen require the greatest amount of extraneous heat, while the lignites, sub-bituminous coals and peats and like fossil fuels, each require less extraneous heat accordingly as the oxygen content increases. All of these materials require the use of a certain amount of extraneous heat, to supplement the heat of formation, to maintain the proper temperature within the charge for carrying on the carbonizing process.

An ancillary feature of the invention relates to a treatment of high volatile coals as a preliminary step for a low temperature carbonization of the same, or for other similar processes; and one object of the treatment is to prevent the coal from agglomerating or sticking to the walls of a retort, and eventually clogging the same.

Certain high volatile coals contain an excess amount of gums and rosins, which swell and stick to the walls of a retort and the mechanism therein, and eventually clog the same, and coat the walls of the retort, so as to destroy its usefulness. This fact has prevented the use of rotary retorts for low temperature carbonization processes.

It has been discovered that when fine coal is exposed to the weather for several months, the exposure to the atmosphere partially overcomes the difficulty referred to; but the time and space required for the storage of coal for weathering, and the danger from loss by spontaneous combustion, would prevent the use of this method for overcoming the difficulty.

This feature of the present invention involves the use of apparatus for treating such coals in an oxidizing atmosphere to prepare the same in a very short time for carrying out the process of carbonization, without swelling or sticking to the walls of a retort; and the object is attained by crushing the coal to comparatively small pieces, then agitating and heating it in the presence of a strong current of air, to a temperature above a steam producing degree and below the degree at which hydrocarbons are educed in vapor form.

The action of the heat and the air current serves to remove the free moisture and enough of the water of formation in the coal, to partially dry up the gums and rosins, and to render them inert, wholly or partially, within a very short period of time; and adapts the coal for a low temperature carbonization process, without clogging the retort within which the same may be performed.

Even with non-coking coals, such as sub-bituminous lignites and peats, the process of carbonization is greatly facilitated by a pre-treating and a preliminary drying of the charge before introducing it into a carbonizing retort. These coals all carry an excessive moisture, which is drawn off by the induced draft in the preliminary drying process, thereby rendering unnecessary a large portion of the condensing equipment which would otherwise be required. The pretreating of the charge brings the temperature of the same, before it is introduced into the carbonizing retort, up to or very close to the critical temperature at which the hydrocarbon vapors will begin to form; and by conducting the spent gases from the combustion chamber under the carbonizing furnace into the combustion chamber of the pretreating furnace, the total amount of heat required by the two furnaces is less than that which would be required for completing the process in a single furnace.

For the purpose of illustrating a specific embodiment of the invention, the fuel to be treated will be assumed to be bituminous coal, and in the drawings, an apparatus for carrying out the steps of the process as applied to bituminous coal, is shown. However, other apparatus may be employed.

Figure 2:
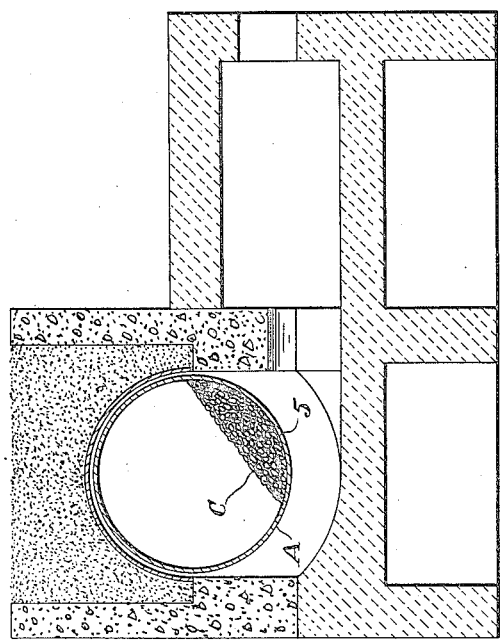

Figure 1 is an elevation of two rotary furnaces for heating coal, one located directly above the other; the lower furnace being shown in side elevation with the ends in section arranged with heads and valves for carrying out the improved low temperature carbonization of the fuel, and the upper furnace being shown in section with heads arranged for carrying out the preliminary treatment which may be used in case of need;

Fig. 2, a cross section of the lower furnace on line 2—2, Fig. 1; and

Figure 3:
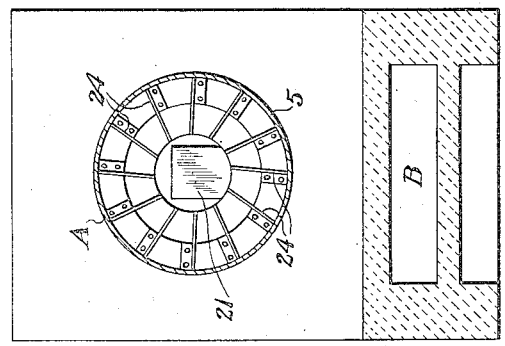

Fig. 3, a cross section of the same on line 3—3, Fig. 1.

Similar numerals refer to similar parts throughout the drawings.

In the apparatus for carrying out the low temperature carbonization process, shown in the lower part of Fig. 1, the length of the cylinder A should be approximately sixteen times its diameter. This is a correct proportion to produce a complete eduction of light liquid hydrocarbons. The charge should occupy one-sixth of the cubic space.

The cylinder A is rotatable and closed at the ends. The coal is passed axially through the cylinder and tumbled during its travel. Heat is extraneously applied to the cylinder by means of a heating chamber indicated by B. The process is continuous, coal entering the intake pipe and carbonized residues or gangue passing out through the discharge pipe. Vapors are led off through vapor pipes to suitable condensing apparatus, not shown.

The cylinder consists of a steel or iron shell indicated by 5. Mounted upon the cylinder near the ends thereof are riding rings 6 supported upon wheels 7 suitably journaled upon bases 8. Mounted upon the cylinder is a ring gear 9 meshing with a pinion 10 arranged to transmit motion to the shell and rotate it.

Secured to the intake end of the shell is a head 11 having a hollow trunnion 12 rotatably mounted in a cap 13 and suitably packed making it gas tight. Secured in the cap 13 is an intake pipe for coal indicated by 14. Connected to the pipe 14 is a rotary valve casing 15, and mounted therein is a rotary valve 16 having vanes so arranged that by rotation of the valve, coal, may pass through the valve but the intake pipe is maintained closed against the escape of vapors and gases. Connected to the cap 13 is a vapor pipe 17 leading to a condenser not shown.

Mounted upon the discharge end of the cylinder is a head 18 provided with a trunnion 19 journaled in a stationary cap 20. A discharge pipe 21 extends through the cap and is connected to a rotary valve casing 22 having a rotary valve 23 therein. Pipe 21 enters a space surrounded by vanes 24 in the end of the cylinder. Connected to the cap 20 is a vapor pipe 25 leading to the condenser not shown.

In the apparatus for carrying out a preliminary treatment of the fuel, shown in the upper part of Fig. 1, the cylinder A', the heating chamber B' and the parts thereof may be exactly like the carbonization apparatus, except that no valves are used in the intake pipe 14' or the discharge pipe 21'; and the tube 17' leads from the fixed cap 13' at the intake end of the cylinder communicating with suction means for drawing air through the cylinder, and there is no cap to close the outlet neck 19' which is open to permit a ready flow of air into the discharge end of the cylinder.

When a preliminary treatment apparatus is used, its discharge pipe 21' preferably leads directly downward into the intake pipe 14 of the carbonization apparatus; and the outlet opening 26 from the heating chamber B of the carbonization apparatus preferably communicates through a pipe 27 and a blower 28 into the reverse end of the heating chamber B' of the pretreating apparatus; so that the heat discharged from the one is utilized in the other.

In the operation of the respective cylinders, coal is entered through the intake pipe at one end of the cylinder, which is rotated by means of power applied to the gearing 9 and 10, and the cylinder is inclined slightly downward from its intake to its discharge end, so that the charge of coal will not only be constantly agitated but will gradually flow or work its way to the discharge end, the speed of the gear as compared with the inclination of the cylinder being such as to regulate the flow of the charge. The coal flows into the pockets formed by the flights 24 or 24' at the discharge end of the cylinder, which elevates the same and drops it into the discharge pipe 21 or 21'.

The coal within the carbonization cylinder is indicated by C. The cylinder during its rotation carries the charge of coal with it up one side until the pieces reach a point such that they fall towards the center of the cylinder. In this continuous motion, the pieces of coal are at all times in contact with the circulating lighter vapors and gases given off, but which have not yet passed out of the container. The greater force with which the particles of hydrogen and carbon are brought into contact, the greater chance there is for the combination of the elements. The construction of the furnace cylinder is such that the charge of coal lies loosely upon a heated plate formed by the furnace wall. The rotation of the cylinder turns the charge continuously so that within a given time every particle is heated to the critical temperature at which it will produce its hydrocarbons. It will be noted that the coal lies on the even portion of the furnace from which heat is transferred to the coal by convection, while the hot gases carry heat to the charge by conduction.

It has been found that applying heat sufficient to raise the temperature of a charge of coal at the rate of 16° F. per minute, there is generated approximately 5000 cubic feet of non-condensable gas per ton of coal, which gas weighs 150 lbs. This gas consists of some 70 per cent by volume of methane $CH_4$, ethane $C_2H_6$, and carbon dioxide $CO_2$. The heats of formation are respectively 22,500 gram calories; 26,650 gram calories; and 97,200 gram calories. At about 640° F. the first gas and oil vapor pass from the furnace, and almost immediately the temperature begins to rise at the rate of some 25° per minute from the heat of formation, during which the extraneous heat may be decreased and maintained at a temperature sufficient to hold the wall of the container or cylinder as hot as the charge therein. It has been found that beyond a temperature of say 850° F. there will be educed so little liquid hydrocarbon, that it is not commercially profitable to carry the heat to beyond that temperature. Furthermore, at a higher heat than 850° F. the fixed or non-condensable gas coming off is of a less thermal value than the gas educed below that temperature, which reduces the commercial value of the fixed gas and at the same time reduces the thermal value of the carbonized residue.

In the operation of the carbonization furnace without pretreating the charge, by taking advantage of the heats of formation, it has been found that the charge should travel about one-third of the length of the cylinder for absorbing heat and raising the temperature sufficiently to drive off the free moisture and begin the volatilization of the hydrocarbons; that while traveling through the second-third of the cylinder the charge should be superheated by the heat of formation caused by a thermic reaction, which rapidly gives off vapor; and that when the charge enters the third and last portion of the cylinder its weight will be reduced by the amount of volatile matter driven off, and will be raised to the highest maximum temperature. The greater part of the volatile matter has then been released, the remaining heaviest vapors are released near to the vapor outlet and are assisted out of the cylinder by the lighter vapors released in the middle section. The extreme length of the container is essential in order that the residues tumbling in the hottest section of the cylinder be materially reduced in weight and may be stripped of the remaining heavy vapors and gas that may be entrained in the residue.

By means of my carbonization process a smokeless residual soft coke fuel is produced from high volatile coals and lignites in form suitable for commercial and domestic use. This is done commercially by reason of the recovery of hydrocarbon oils. High moisture coals of which there are extensive deposits in the West are so acted upon that a fuel is produced suitable for domestic and commercial use and a fuel oil is obtained suitable for use in locomotives. This process is adapted for producing oil from oil shales. The apparatus and steps may be varied to suit different fuel and the particular results to be obtained in the production of solid fuel and oil fuel will require a variation in the apparatus employed and the steps of the process without departing from my invention.

When the pretreating apparatus is used, it is heated so as to create a substantially uniform temperature within the cylinder throughout its whole length, and for the purpose of the preliminary process, the temperature within the cylinder is preferably maintained at some 500° F. so as to drive off a sufficient part of the free moisture and to remove a sufficient portion of the water formation in the coal, for drying up the gums and rosins and to render them inert, or as nearly inert as may be desired, which result is accomplished by the constant agitation of the coal as it passes through the retort, and by the constant current of air passing through the retort, while the coal is maintained at the described temperature.

In carrying out this pretreating process, the best results have been obtained by a preliminary crushing of the coal into small pieces of nut coal size, and pretreating the same in an oxidizing atmosphere at a temperature slightly below the critical point for the eduction of hydrocarbons; and it has been found that coal treated in this manner, can be passed through a carbonization or coking process without unduly swelling or sticking to the walls of the retort, or the machinery located therein.

I claim:

1. The process of educing hydrocarbon oils from fossil fuel, which consists in confining the fuel within a closed container, flooding the fuel with extraneous heat so as to rapidly raise its temperature to that at which hydrocarbon vapors are educed, then decreasing and maintaining the rate of supply of extraneous heat only sufficient so that the extraneous heat and the heat of formation of the vapors being evolved will rapidly permeate the pieces of fuel and suddenly bring every particle thereof to the temperature for evolving hydrocarbon vapors, and withdrawing the volatilized vapors.

2. The process of educing hydrocarbon oils from fossil fuel, which consists in confining the fuel within a closed container having a relatively large free space for volatile matters, flooding the fuel with extraneous heat so as to rapidly raise its temperature to that at which hydrocarbon vapors are educed, then decreasing and maintaining the rate of supply of extraneous heat only sufficient so that the extraneous heat and the heat of formation of the vapors being evolved will rapidly permeate the pieces of fuel and suddenly bring every particle thereof to the temperature for evolving hydrocarbon vapors, and withdrawing the volatilized vapors.

3. The process of educing hydrocarbon oils from solid fuel, which consists in confining and tumbling the fuel within a closed container, flooding the fuel with extraneous heat so as to rapidly raise its temperature to that at which hydrocarbon vapors are educed, then decreasing and maintaining the rate of supply of extraneous heat only sufficient so that the extraneous heat and the heat of formation of the vapors being evolved will rapidly permeate the pieces of fuel and suddenly bring every particle thereof to the temperature for evolving hydrocarbon vapors, and withdrawing the volatilized vapors.

4. The process of educing hydrocarbon oils from solid fuel, which consists in confining and tumbling the fuel within a closed container having a relatively large free space for volatile matter, flooding the fuel with extraneous heat so as to rapidly raise its temperature to that at which hydrocarbon vapors are educed, then decreasing and maintaining the rate of supply of extraneous heat only sufficient so that the extraneous heat and the heat of formation of the vapors being evolved will rapidly permeate the pieces of fuel and suddenly bring every particle thereof to the temperature for evolving hydrocarbon vapors, and withdrawing the hydrocarbon vapors.

5. The process of educing hydrocarbon oils from solid fuel, which consists in confining, tumbling and advancing the fuel within a closed container, flooding the fuel with extraneous heat so as to rapidly raise the temperature to that at which hydrocarbon vapors are educed, then decreasing and maintaining the rate of supply of extraneous heat only sufficient so that the extraneous heat and the heat of formation of the vapors being evolved will rapidly permeate the pieces of fuel and suddenly bring every particle thereof to the temperature for evolving hydrocarbon vapors, and withdrawing the volatilized vapors.

6. The process of educing hydrocarbon oils from solid fuel, which consists in confining, tumbling and advancing the fuel within a closed container having a relatively large free space for volatile matter, flooding the fuel with extraneous heat so as to rapidly raise the temperature to that at which hydrocarbon vapors are educed, then decreasing and maintaining the rate of supply of extraneous heat only sufficient so that the extraneous heat and the heat of formation of the vapors being evolved will rapidly permeate the pieces of fuel and suddenly bring every particle thereof to the temperature for evolving hydrocarbon vapors, and withdrawing the volatilized vapors.

7. The process of educing hydrocarbon oils from solid fuel, which consists in first maintaining the fuel above steam producing temperature and below hydrocarbon volatilizing temperature in the presence of moving air until the agglomerating content is rendered inert to the extent desired, and then confining the fuel in a closed container and flooding it with sufficient extraneous heat to develop and supplement heat of formation and maintain the charge at a hydrocarbon volatilizing temperature.

8. The method of treating solid fuel for a carbonization process, which includes maintaining it above steam producing temperature and below hydrocarbon volatilizing temperature in the presence of a current of air until the agglomerating content is rendered inert to the extent desired.

9. The method of treating solid fuel for a carbonization process, which includes reducing it to nut size and maintaining it above steam producing temperature and below hydrocarbon volatilizing temperature in the presence of a current of air, until the agglomerating content is rendered inert to the extent desired.

10. The method of treating solid fuel for a carbonization process, which includes maintaining it above steam producing temperature and below hydrocarbon volatilizing temperature, and agitating it in the presence of a current of air, until the agglomerating content is rendered inert to the extent desired.

11. The method of treating solid fuel for a carbonization process, which includes reducing it to nut size and maintaining it at a temperature of some 500° F. in the presence of a current of air, until the agglomerating content is rendered inert to the extent desired.

12. The method of treating solid fuel for a carbonization process, which includes maintaining it at a temperature of some 500° F., and agitating it in the presence of a current of air, until the agglomerating content is rendered inert to the extent desired.

13. The process of educing hydrocarbon oils from solid fuel, which consists in confining and agitating the fuel in a closed container and flooding it with extraneous heat to develop and supplement heat of formation sufficient only to maintain the charge at a hydrocarbon volatilizing temperature, and withdrawing the volatilized vapors.

14. The process of educing hydrocarbon oils from solid fuel, which consists in confining and agitating the fuel in a closed container and flooding it with extraneous heat to develop and supplement heat of formation sufficient only to maintain the charge at a hydrocarbon volatilizing temperature.

15. In the process of educing volatile hydrocarbons from fossil fuel, the step of maintaining it above steam producing temperature and below hydrocarbon volatilizing temperature in the presence of a current of air until the agglomerating content is rendered inert to the extent desired.

CLARENCE B. WISNER.